(12) United States Patent
Little et al.

(10) Patent No.: US 9,110,851 B2
(45) Date of Patent: Aug. 18, 2015

(54) SYSTEM AND METHOD FOR PERSISTING TRANSACTION RECORDS IN A TRANSACTIONAL MIDDLEWARE MACHINE ENVIRONMENT

(75) Inventors: Todd Little, Palatine, IL (US); Xiangdong Li, Beijing (CN); Xianzheng Lv, Beijing (CN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 12 days.

(21) Appl. No.: 13/414,607

(22) Filed: Mar. 7, 2012

(65) Prior Publication Data
US 2013/0086419 A1 Apr. 4, 2013

Related U.S. Application Data

(60) Provisional application No. 61/541,052, filed on Sep. 29, 2011.

(51) Int. Cl.
*G06F 11/00* (2006.01)
*G06F 11/14* (2006.01)
*G06F 11/20* (2006.01)

(52) U.S. Cl.
CPC ........ *G06F 11/1471* (2013.01); *G06F 11/2097* (2013.01); *G06F 11/2038* (2013.01); *G06F 11/2043* (2013.01); *G06F 2201/80* (2013.01)

(58) Field of Classification Search
USPC ...................................... 714/4.11, 45, 48, 20
See application file for complete search history.

(56) References Cited

U.S. PATENT DOCUMENTS

| | | | |
|---|---|---|---|
| 6,640,244 B1 | 10/2003 | Bowman-Amuah | |
| 7,076,508 B2 | 7/2006 | Bourbonnais et al. | |
| 7,730,489 B1 * | 6/2010 | Duvur et al. | 718/104 |
| 7,917,470 B2 | 3/2011 | Barnes et al. | |
| 8,312,190 B2 | 11/2012 | Wang et al. | |
| 2004/0236990 A1 * | 11/2004 | Pavlik et al. | 714/15 |
| 2005/0114285 A1 * | 5/2005 | Cincotta | 707/1 |
| 2007/0294426 A1 | 12/2007 | Huang et al. | |
| 2009/0086748 A1 | 4/2009 | Wang et al. | |
| 2009/0259887 A1 * | 10/2009 | Takahira | 714/15 |
| 2010/0049718 A1 * | 2/2010 | Aronovich et al. | 707/10 |
| 2012/0151272 A1 * | 6/2012 | Behrendt et al. | 714/39 |
| 2012/0266011 A1 * | 10/2012 | Storer et al. | 714/1 |

OTHER PUBLICATIONS

International Search Report and Written Opinion dated Nov. 30, 2012, International Application No. PCT/US2012/056941, 8 pages.

* cited by examiner

*Primary Examiner* — Sarai Butler
(74) *Attorney, Agent, or Firm* — Tucker Ellis LLP

(57) ABSTRACT

A transactional system can utilize the distributed storage and high availability (HA) capability provided by a clustered database to support easy and feasible disaster recovery. The transactional middleware machine environment comprises one or more transactional application servers associated with a transaction. The one or more transactional application servers operate to persist transactional log information associated with the transaction in a database that connects with said one or more transactional application servers at a local site. The database at the local site operates to replicate the persisted transactional log information to a remote database at a remote site. The remote database allows a different transactional application server at the remote site to recover the persisted transactional log information and complete the transaction, when a disaster disables the local site.

20 Claims, 3 Drawing Sheets

SYSTEM AND METHOD FOR PERSISTING TRANSACTION RECORDS IN A TRANSACTIONAL MIDDLEWARE MACHINE ENVIRONMENT

CLAIM OF PRIORITY

This application claims the benefit of priority on U.S. Provisional Patent Application No. 61/541,052, entitled "SYSTEM AND METHOD FOR PERSISTING TRANSACTION RECORDS IN A TRANSACTIONAL MIDDLEWARE MACHINE ENVIRONMENT" filed Sep. 29, 2011, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems and software such as middleware, and is particularly related to supporting disaster recovery in a transactional middleware machine environment.

BACKGROUND

A transactional middleware system, or a transaction oriented middleware, includes enterprise application servers that can process various transactions within an organization. With the developments in new technologies such as high performance network and multiprocessor computers, there is a need to further improve the performance of the transactional middleware. These are the generally areas that embodiments of the invention are intended to address.

SUMMARY

Described herein is a transactional system that can utilize the distributed storage and high availability (HA) capability provided by a clustered database to support easy and feasible disaster recovery. The transactional middleware machine environment comprises one or more transactional application servers associated with a transaction. The transactional application servers can persist transactional log information associated with the transaction into a database that connects with one or more transactional application servers at a local site. The database at the local site can replicate the persisted transactional log information to a database at a remote site. When a disaster disables the local site, the remote database allows a different transactional application server at the remote site to recover the persisted transactional log information and complete the transaction.

DETAILED DESCRIPTION

Figure 1:
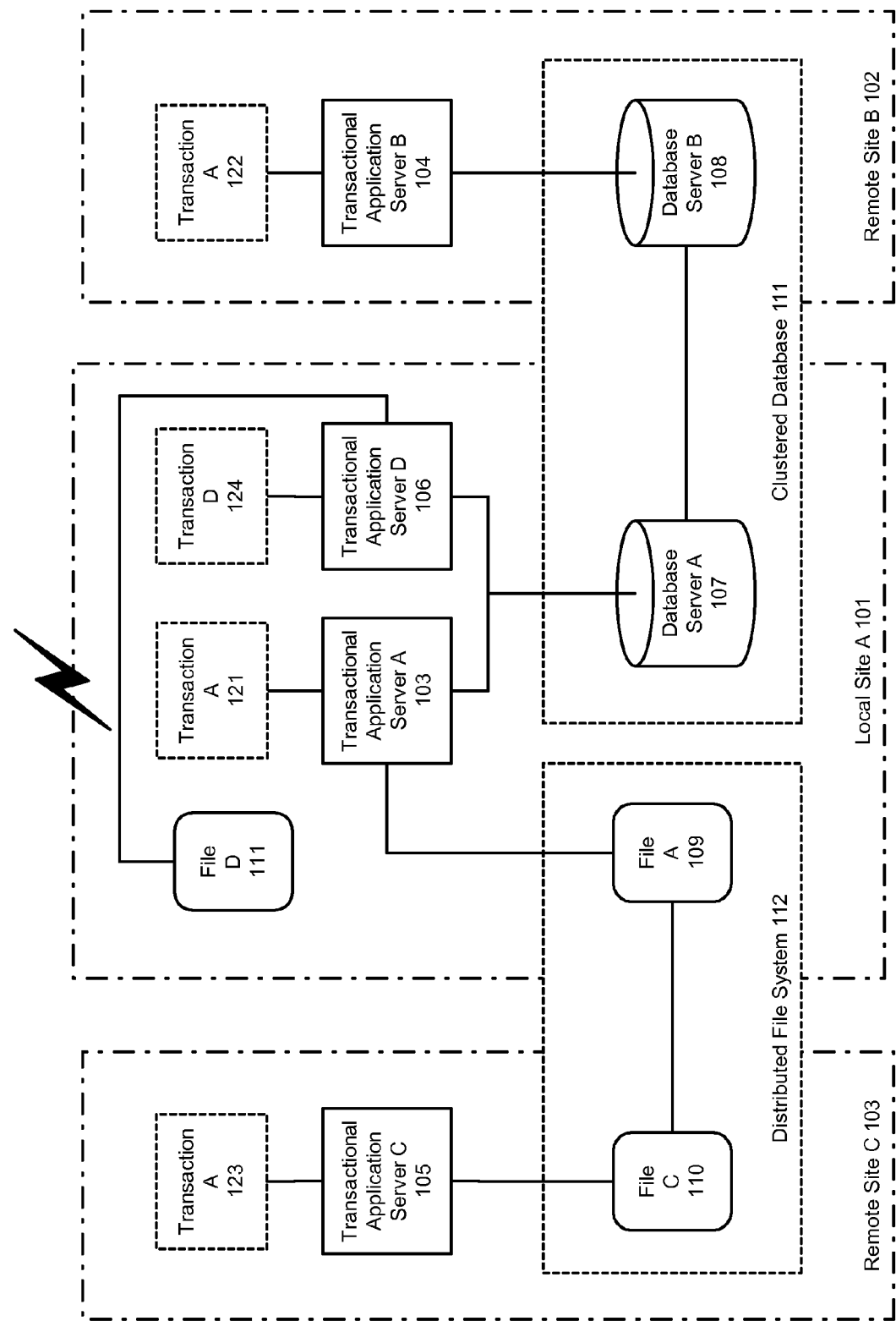
FIG. 1 shows an illustration of a transactional middleware machine environment that supports disaster recovery, in accordance with an embodiment of the invention.

Described herein is a system and method for supporting a transactional middleware system, such as Tuxedo, that can take advantage of fast machines with multiple processors, and a high performance network connection. A transactional system can utilize the distributed storage and high availability (HA) capability provided by a clustered database to support easy and feasible disaster recovery. The transactional middleware machine environment comprises one or more transactional application servers associated with a transaction. Said one or more transactional application servers operate to persist transactional log information associated with the transaction to a database that connects with said one or more transactional application servers at a local site. The database at the local site operates to replicate the persisted transactional log information to a remote database at a remote site. The remote database allows a different transactional application server at the remote site to recover the persisted transactional log information and complete the transaction, when a disaster disables the local site.

In accordance with an embodiment of the invention, the system comprises a combination of high performance hardware, e.g. 64-bit processor technology, high performance large memory, and redundant InfiniBand and Ethernet networking, together with an application server or middleware environment, such as WebLogic Suite, to provide a complete Java EE application server complex which includes a massively parallel in-memory grid, that can be provisioned quickly, and can scale on demand. In accordance with an embodiment, the system can be deployed as a full, half, or quarter rack, or other configuration, that provides an application server grid, storage area network, and InfiniBand (IB) network. The middleware machine software can provide application server, middleware and other functionality such as, for example, WebLogic Server, JRockit or Hotspot JVM, Oracle Linux or Solaris, and Oracle VM. In accordance with an embodiment, the system can include a plurality of compute nodes, IB switch gateway, and storage nodes or units, communicating with one another via an IB network. When implemented as a rack configuration, unused portions of the rack can be left empty or occupied by fillers.

In accordance with an embodiment of the invention, referred to herein as "Sun Oracle Exalogic" or "Exalogic", the system is an easy-to-deploy solution for hosting middleware or application server software, such as the Oracle Middleware SW suite, or Weblogic. As described herein, in accordance with an embodiment the system is a "grid in a box" that comprises one or more servers, storage units, an IB fabric for storage networking, and all the other components required to host a middleware application. Significant performance can be delivered for all types of middleware applications by leveraging a massively parallel grid architecture using, e.g. Real Application Clusters and Exalogic Open storage. The system delivers improved performance with linear I/O scalability, is simple to use and manage, and delivers mission-critical availability and reliability.

In accordance with an embodiment of the invention, Tuxedo is a set of software modules that enables the construction, execution, and administration of high performance, distributed business applications and has been used as transactional middleware by a number of multi-tier application development tools. Tuxedo is a middleware platform that can be used to manage distributed transaction processing in distributed computing environments. It is a proven platform for unlocking enterprise legacy applications and extending them to a services oriented architecture, while delivering unlimited scalability and standards-based interoperability.

In accordance with an embodiment of the invention, a transactional middleware system, such as a Tuxedo system, can take advantage of fast machines with multiple processors, such as an Exalogic middleware machine, and a high performance network connection, such as an Infiniband (IB) network.

In accordance with an embodiment of the invention, the transactional system can utilize the distributed storage and high availability (HA) capability provided by a clustered database to support easy and feasible disaster recovery.

Persisting Transaction Records into a Clustered Database

In accordance with an embodiment of the invention, a transactional application server can persist transaction records, such as transactional log information, into a clustered database to enhance high availability (HA) capability for transactions in a transactional middleware machine environment. The clustered database can replicate such transactional information from a local site to a remote site to provide HA capability for the transactional middleware machine environment.

FIG. 1 shows an illustration of a transactional middleware machine environment that supports disaster recovery, in accordance with an embodiment of the invention. As shown in FIG. 1, one or more transactional application servers (Server A 103 and Server D 106) can persist transactional information associated with a transaction (Transaction A 121) into a clustered database, e.g. a Database Server A 107 at a local site A 101. The clustered database 111 can replicate the transaction log information to a remote database server B 108 in a remote site B 102.

As shown in FIG. 1, when a disaster strikes the local site A, a transactional application server B 104 at the remote site B can pick up the persisted transaction log information for transaction A 122 in database server B from a remote database and complete the transaction immediately, without delay. On the other hand, if the transaction log for a transaction D 124 is only written in a flat file D 111 at the local site A, then it may take longer time for the system to perform a disaster recovery and complete the transaction.

In accordance with an embodiment of the invention, when the transactional system is activated, the transactional system can open a database connection and write records to a database instead of writing to a file. The transactional system can be configured to write transaction log information into the database that the application is currently using in order to save the number of concurrent database connections.

Additionally, an abstracted transactional file operation interface can be used for storing the transaction log information in a file system, such as a distributed file system 112. The distributed file system can synchronize the transaction log information stored in a file A 109 at the local site A to a file C 110 at a remote site C 1103. Similarly, when a disaster strikes the local site A, a transactional application server C 105 at the remote site C can pick up the stored transaction log information for transaction A 123 in file C and complete the transaction.

Storing the transaction log information in a file system may not be convenient for disaster-recovery solution, since transaction log information in the flat file has to be synchronized on the recovery site with an unavoidable time window. Additionally, the support for a distributed file system can be limited.

In accordance with an embodiment of the invention, by persisting transaction log information in a clustered database, the system can exploit the replication and other HA aspects inherent from the underlying database system. The system can also enhance handling of disaster recovery scenarios, especially in a scenario such as cross-site recovery. Also, the need for a distributed file system solutions can be alleviated. The system also reduces complexity for a user, since configuration of a database is generally less complicated and/or already a necessity, e.g. for normal runtime/application work, compared to distributed file systems such as NFS, etc.

Figure 2:
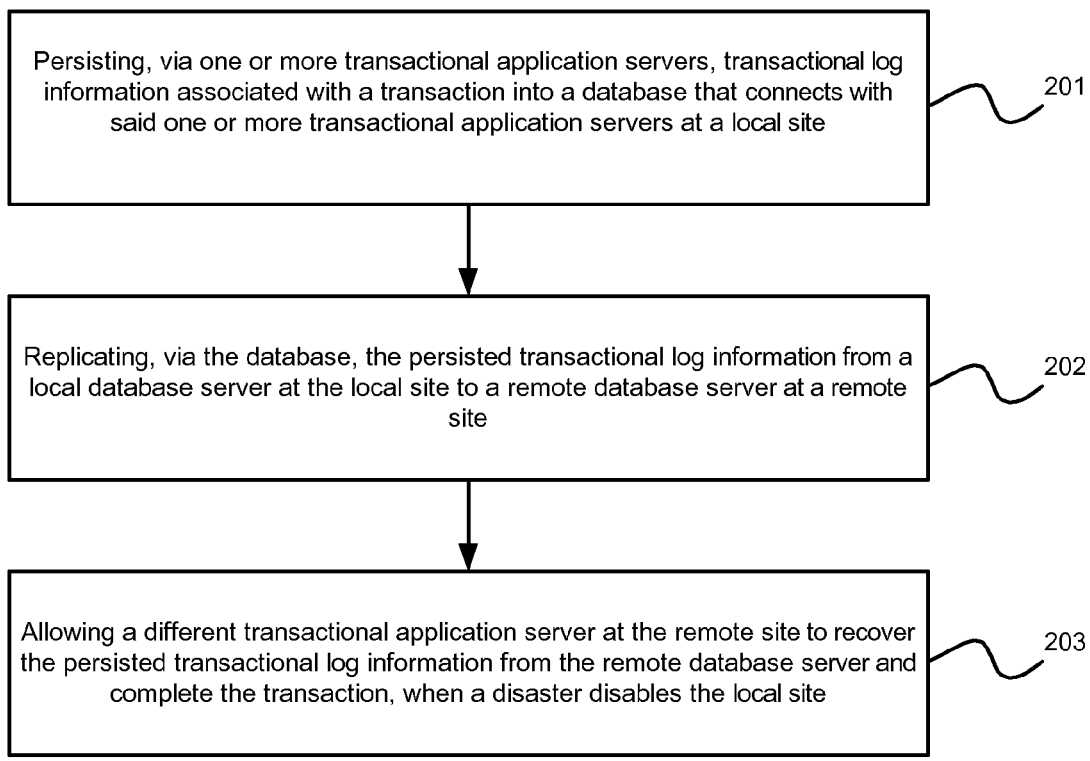
FIG. 2 illustrates an exemplary flow chart for supporting disaster recovery in a transactional middleware machine environment, in accordance with an embodiment of the invention.

FIG. 2 illustrates an exemplary flow chart for supporting disaster recovery in a transactional middleware machine environment, in accordance with an embodiment of the invention. As shown in FIG. 2, at step 201, one or more transactional application servers can persist transactional log information associated with a transaction into a database that connects with said one or more transactional application servers at a local site. Then, at step 202, the database can replicate the persisted transactional log information from a local database server at the local site to a remote database server at a remote site. Finally, at step 203, the system allows a different transactional application server at the remote site to recover the persisted transactional log information from the remote database server and complete the transaction, when a disaster disables the local site.

Transaction Log (TLOG) in Tuxedo

In the example of Tuxedo, the Transaction Log (TLOG) contains a log record, in which information about transactions can be kept until the transaction is completed. Tuxedo can utilize the distributed storage and HA capability provided by a clustered database, for example an Oracle RAC database, to support easy and feasible disaster recovery. Additionally, the database can replicate the TLOG records to distributed sites to achieve even higher availability.

In accordance with an embodiment of the invention, a user can create a transaction log for different domains. The user can first create a Universal Device List (UDL) in order to create a TLOG in the Tuxedo environment. The UDL is a map of a transactional file system, such as the Tuxedo file system. The UDL can be loaded into a shared memory when an application is booted. To create an entry in the UDL for the TLOG device, the system can create a UDL on each machine using global transactions. The Bulletin Board Liaison (BBL) can initialize and open the TLOG during the boot process. Then, the user can define the related transaction-related parameters in a configuration file, for example the MACHINES sections in a Tuxedo configuration file, in order to configure the Tuxedo servers.

In accordance with an embodiment of the invention, an abstracted file operation interface can be provided in the Tuxedo environment. When the interface is activated, Tuxedo can open a database connection instead of opening a file. Thus, Tuxedo can write TLOG into the database instead of writing to file, and the database can replicate the TLOG records to distributed sites to get a higher availability.

In accordance with an embodiment of the invention, a clustered database can be used to support the persistence of transactional log information. The clustered database such as Oracle RAC database allows multiple computers to run Oracle RDBMS software simultaneously while accessing a single database. Tuxedo can utilize the distributed storage and HA capability provided by the clustered database. In a clustered database environment, two or more computers (each with an instance) can concurrently access a single database. The system allows an application or a user to connect to either one of the computers and have access to a single coordinated set of data.

On the other hand, in a non-clustered database, a single instance accesses a single database. The database consists of a collection of data files, control files, and redo logs located on disk. The instance comprises the collection of Oracle-related memory and operating system processes that run on a computer system.

Figure 3:
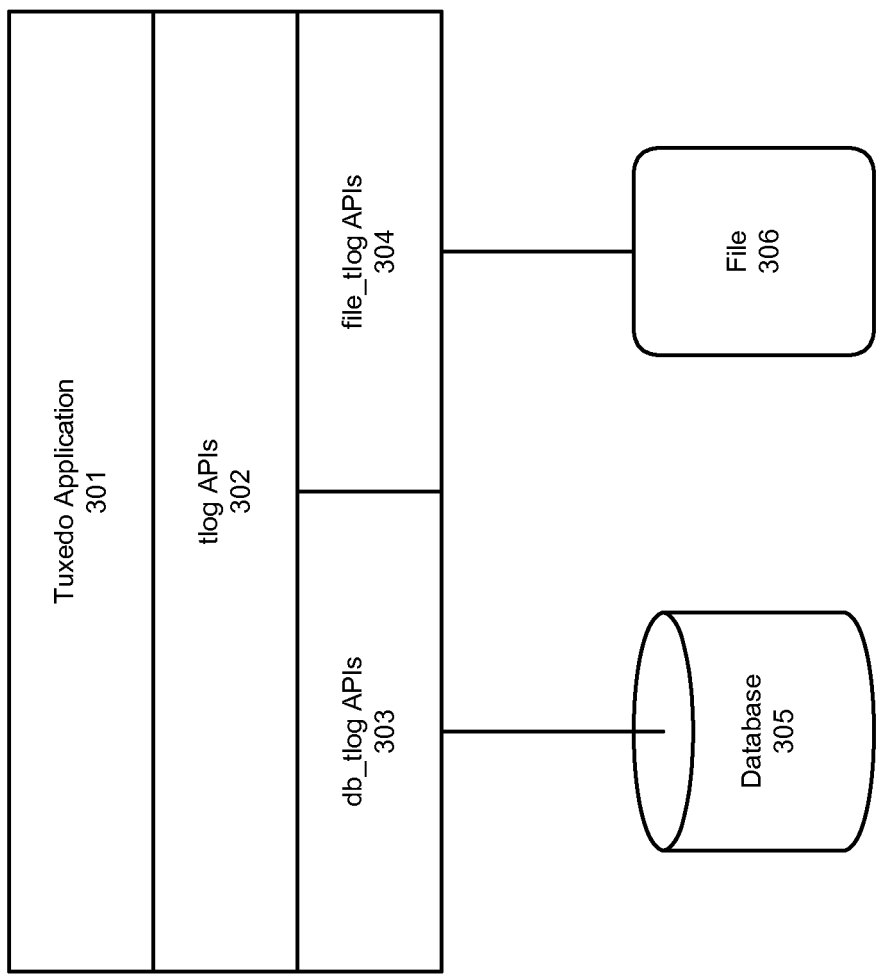
FIG. 3 shows an illustration of a complex interface in a transactional middleware machine environment, in accordance with an embodiment of the invention.

FIG. 3 shows an illustration of a complex interface in a transactional middleware machine environment, in accordance with an embodiment of the invention. Tuxedo supports two approaches to persist the TLOG records, one approach is to use information stored in a clustered database, and another approach is to use information stored in a file system. As shown in FIG. 3, in order to support persisting a transaction log record, a Tuxedo application 301 can first access a high-level API, such as the TLOG APIs 302. The tlog APIs provide a set of uniform interfaces to different APIs in Tuxedo for persisting the TLOG record. This high level API, in turn, can choose to invoke one of the two sets of low level APIs that include db_tlog APIs 303, which deal with the TLOG record in ORACLE database, and file_tlog APIs 304, which deal with the TLOG record in file. The high level TLOG APIs can dynamically invoke one of the two low level APIs according Tuxedo's configuration, tuxconfig or dmconfig. This complex interface can be employed to replace an abstracted Tuxedo file operation interface, so that when it is activated, Tuxedo can open a database connection instead of opening a file, and write records to a database instead of a flat file.

In accordance with an embodiment of the invention, in order to save the number of concurrent database connections, a dedicated item in a configuration file can be used to configure an operation interface in the Tuxedo environment, so that the TLOG can be written into the same database as the Tuxedo application is currently using. Also, if configured, TLOG can be written into the same database as the application is using in the same connection to save the number of concurrent database connections. For example, Oracle XA provides an interface xaoSvcCtx( ), which returns the database service handle for a given XA connection. The interface db_tlog does not open a new connection to the database server. Instead, the system makes use of the connection previously opened by the Transaction Processing Monitor (TPM).

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for supporting disaster recovery in a transactional middleware machine environment, comprising:
providing a clustered database accessible to a plurality of application servers wherein the clustered database provides a coordinated set of data across a distributed plurality of database servers, wherein the clustered database operate to replicate said set of data across said plurality of database servers;
providing a connection from each application server to said clustered database, whereby an application operating on said application server can
read data, over said connection, from said set of data for commencing a transaction,
process said data, and
write processed data, over said connection, to said set of data for completing a transaction;
defining a plurality of different transaction logs, by defining for each application server of the plurality of application servers, a transaction log comprising a plurality of log records of transactions in process on said application server;
persisting, the plurality of different transaction logs to said clustered database over said connection from each application server to said clustered database;
replicating each of said plurality of different transaction logs across said plurality of database servers by using the clustered database to generate a plurality of replica different transaction logs wherein each of said plurality of different transaction logs is associated with at least one replica different transaction log stored at a site remote from the associated different transaction log; and
when a disaster disables a first application server having a first transaction log of said plurality of different transaction logs associated with a first replica transaction log of said plurality of replica different transaction logs stored at a site remote from the first transaction log, allowing a second application server at a site remote from the first application server to recover the first replica transaction log of said plurality of replica different transaction logs from one of said plurality of database servers and complete transactions identified in said first replica transaction log.

2. The method of claim 1, further comprising:
defining the plurality of different transaction logs in a universal device list comprising a map of a transactional file system.

3. The method of claim 1, further comprising:
defining the plurality of different transaction logs in a universal device list (UDL) comprising a map of a transactional file system wherein the UDL is loaded into a shared memory when an application is booted.

4. The method of claim 1, further comprising providing an application programming interface (API) for persisting, the transaction log of each application server, to said clustered database over said connection from each application server to said clustered database.

5. The method of claim 1, further comprising providing an application programming interface for persisting, the transaction log of each application server, to said clustered database over said connection from each application server to said clustered database and providing a configuration file which invokes said (API).

6. The method of claim 1, wherein persisting the transaction log over said connection avoids creation of additional concurrent database connections for persisting the transaction log.

7. The method of claim 1, wherein each transaction is a two-phase transaction.

8. The method of claim 7, further comprising allowing the transaction log to contain persist state of a transaction manger after successfully committing a first phase of the two-phase transaction.

9. The method of claim 1, further comprising:
providing a transaction processing monitor (TPM) which establishes said connection.

10. A system supporting disaster recovery in a transactional middleware machine environment, comprising:
a clustered database accessible to a plurality of application servers wherein the clustered database provides a coordinated set of data across a distributed plurality of database servers, wherein the clustered database operate to replicate said set of data across said plurality of database servers;
a connection from each application server to said clustered database, whereby an application operating on said application server can
read data, over said connection, from said set of data for commencing a transaction,
process said data, and
write processed data, over said connection, to said set of data for completing a transaction;
a plurality of different transaction logs comprising a separate transaction log for each particular application server comprising a plurality of log records of transactions in process on said each particular application server;
wherein the each particular application server persists the separate transaction log associated with said each particular application server to said clustered database over said connection from said particular application server to said clustered database;
wherein the clustered database operates to replicate each of said plurality of different transaction logs across said plurality of database servers by using the clustered database to generate a plurality of replica different transaction logs wherein each of said plurality of different transaction logs is associated with at least one replica different transaction log stored at a site remote from the associated different transaction log; and
wherein, when a disaster disables a first particular application server having a first separate transaction log and associated with a first separate replica transaction log stored at a site remote from the first separate transaction log, a second application server at a site remote from the first particular application server is configured to recover the first separate replica transaction log from one of said plurality of database servers and complete transactions identified in said first separate replica transaction log.

11. The system of claim 10, wherein:
the separate transaction log of each particular application server is defined in a universal device list comprising a map of a transactional file system.

12. The system of claim 10, wherein:
the separate transaction log of each particular application server is defined in a universal device list (UDL) comprising a map of a transactional file system and wherein the UDL is loaded into a shared memory when an application is booted.

13. The system of claim 10, further comprising:
an application programming interface (API) for persisting, the separate transaction log of each particular application server, to said clustered database over said connection from each particular application server to said clustered database.

14. The system of claim 10, further comprising:
an application programming interface for persisting, the separate transaction log of each particular application server, to said clustered database over said connection from each particular application server to said clustered database; and
a configuration file which invokes said (API).

15. The system of claim 10, wherein persisting the transaction log over said connection avoids creation of additional concurrent database connections for persisting the transaction log.

16. The system of claim 10, wherein each transaction is a two-phase transaction.

17. The system of claim 16, wherein the separate transaction log of each particular application server contains persist state of a transaction manger after successfully committing a first phase of the two-phase transaction.

18. The system of claim 10, further comprising:
a transaction processing monitor (TPM) which establishes said connection.

19. A non-transitory computer readable storage medium including instructions stored thereon for supporting disaster recovery in a transactional middleware machine environment, which instructions, when executed by a computer, cause the computer to perform steps comprising:
providing a clustered database accessible to a plurality of application servers wherein the clustered database provides a coordinated set of data across a distributed plurality of database servers, wherein the clustered database operate to replicate said set of data across said plurality of database servers;
providing a connection from each application server to said clustered database, whereby an application operating on said application server can
read data, over said connection, from said set of data for commencing a transaction,
process said data, and
write processed data, over said connection, to said set of data for completing a transaction;
defining a plurality of different transaction logs, by defining for each application server of the plurality of application servers, a transaction log comprising a plurality of log records of transactions in process on said application server;
persisting, the plurality of different transaction logs to said clustered database over said connection from each application server to said clustered database;
replicating each of said plurality of different transaction logs across said plurality of database servers by using the clustered database to generate a plurality of replica different transaction logs wherein each of said plurality of different transaction logs is associated with at least one replica different transaction log stored at a site remote from the associated different transaction log; and when a disaster disables a first application server having a first transaction log of said plurality of different transaction logs associated with a first replica transaction log of said plurality of replica different transaction logs stored at a site remote from the first transaction log, allowing a second application server at a site remote from the first application server to recover the first replica transaction log of said plurality of replica different transaction logs from one of said plurality of database servers and complete transactions identified in said first replica transaction log.

20. The non-transitory computer readable storage medium of claim 19, including further instructions stored thereon, which, when executed by a computer, cause the computer to perform further steps comprising:

defining the plurality of different transaction logs in a universal device list comprising a map of a transactional file system.

* * * * *

UNITED STATES PATENT AND TRADEMARK OFFICE
CERTIFICATE OF CORRECTION

PATENT NO. : 9,110,851 B2
APPLICATION NO. : 13/414607
DATED : August 18, 2015
INVENTOR(S) : Little et al.

It is certified that error appears in the above-identified patent and that said Letters Patent is hereby corrected as shown below:

Claims

In column 7, line 18, in claim 8, delete "manger" and insert -- manager --, therefor.

In column 8, line 31, in claim 17, delete "manger" and insert -- manager --, therefor.

Signed and Sealed this
Twenty-first Day of June, 2016

Michelle K. Lee
*Director of the United States Patent and Trademark Office*